(12) United States Patent
Cendrillon et al.

(10) Patent No.: US 8,792,598 B1
(45) Date of Patent: Jul. 29, 2014

(54) COEXISTENCE OF MULTIPLE COMMUNICATION TECHNOLOGIES ON A SINGLE DEVICE

(75) Inventors: Raphael Cendrillon, Palo Alto, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 174 days.

(21) Appl. No.: 13/565,228

(22) Filed: Aug. 2, 2012

Related U.S. Application Data

(60) Provisional application No. 61/514,158, filed on Aug. 2, 2011.

(51) Int. Cl.
*H04B 1/10* (2006.01)
(52) U.S. Cl.
USPC .......................................... 375/346
(58) Field of Classification Search
CPC .......... H04B 15/00; H04B 1/10; H04B 1/109; H04B 1/12; H04B 1/123; H04B 1/126
USPC ................... 375/295, 296, 297, 346
See application file for complete search history.

(56) References Cited

U.S. PATENT DOCUMENTS

| | | | |
|---|---|---|---|
| 6,959,056 B2 * | 10/2005 | Yeap et al. | 375/346 |
| 7,809,045 B2 * | 10/2010 | Visoz et al. | 375/144 |
| 7,813,453 B2 * | 10/2010 | Khandekar et al. | 375/340 |
| 8,605,837 B2 * | 12/2013 | Wiese et al. | 375/346 |
| 2002/0072344 A1 * | 6/2002 | Souissi | 455/296 |
| 2007/0190945 A1 * | 8/2007 | Lee et al. | 455/63.1 |
| 2010/0177857 A1 * | 7/2010 | Huttunen et al. | 375/350 |
| 2012/0214524 A1 * | 8/2012 | Wajcer et al. | 455/502 |

* cited by examiner

*Primary Examiner* — Kevin Kim

(57) ABSTRACT

A method of mitigating interference from a transmitter of a communication device at a receiver of the same communication device, where the communication device operates according to at least a first and a second communication protocol, includes generating, in the transmitter, a transmit signal conforming to the second communication protocol, generating an interference estimate signal from the transmit signal using an adaptive filter, and receiving a receive signal at the receiver. The receive signal includes a desired component conforming to the first communication protocol and an interference component corresponding to the transmit signal. The method also includes processing the receive signal using the interference estimate signal to remove at least a portion of the interference component from the receive signal.

36 Claims, 9 Drawing Sheets

*PRIOR ART*

COEXISTENCE OF MULTIPLE COMMUNICATION TECHNOLOGIES ON A SINGLE DEVICE

CROSS-REFERENCES TO RELATED APPLICATION

This disclosure claims the benefit of U.S. Provisional Patent Application No. 61/514,158, filed on Aug. 2, 2011, the disclosure of which is hereby incorporated by reference herein in its entirety.

FIELD OF TECHNOLOGY

The present disclosure relates generally to communication networks and, more particularly, to methods and systems for mitigating interference between communications of different communication technologies utilized by a communication device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless communication networks such as wireless wide area networks (WWAN), wireless local area networks (WLAN), and wireless personal area networks (WPAN) have become increasingly common, with different types of networks (and the corresponding wireless technologies) frequently coexisting in a single communication device. For example, user devices (e.g., mobile handsets) designed to operate using a cellular technology (e.g., UMTS) are increasingly designed to also operate using other wireless technologies, such as WiFi and/or Bluetooth. Moreover, communications utilizing the various wireless technologies often occur simultaneously. For example, a user device may receive an audio stream via a cellular interface while forwarding the audio stream to a car stereo via a Bluetooth interface. As a result of this increasing overlap, interference between different wireless technologies has become a significant problem.

SUMMARY

In one embodiment, a method of mitigating interference from a first transmitter of a communication device at a first receiver of the communication device, wherein the communication device is configured to operate according to at least a first communication protocol and a second communication protocol different than the first communication protocol, includes generating, in the first transmitter, a first transmit signal conforming to the second communication protocol, generating a first interference estimate signal from the first transmit signal using a first adaptive filter, and receiving a first receive signal at the first receiver. The first receive signal includes (i) a first desired component conforming to the first communication protocol and (ii) a first interference component corresponding to the first transmit signal. The method also includes processing the first receive signal using the first interference estimate signal to remove at least a portion of the first interference component from the first receive signal.

In another embodiment, a communication device configured to operate according to at least a first communication protocol and a second communication protocol different than the first communication protocol includes a first transmitter configured to generate a first transmit signal conforming to the second communication protocol, a first adaptive filter configured to generate a first interference estimate signal from the first transmit signal, and a first receiver. The first receiver is configured to receive a first receive signal. The first receive signal includes (i) a first desired component conforming to the first communication protocol and (ii) a first interference component corresponding to the first transmit signal. The first receiver is also configured to process the first receive signal using the first interference estimate signal to remove at least a portion of the first interference component from the first receive signal.

In another embodiment, a method of mitigating interference in a communication device configured to (i) decode signals conforming to a first communication protocol received via a first antenna, (ii) generate signals conforming to a second communication protocol different than the first communication protocol to be transmitted via a second antenna different than the first antenna, (iii) decode signals conforming to a third communication protocol received via a third antenna, and (iv) generate signals conforming to a fourth communication protocol different than the third communication protocol to be transmitted via a fourth antenna different than the third antenna, wherein at least one of (i) the third communication protocol is different than the first communication protocol, (ii) the fourth communication protocol is different than the second communication protocol, (iii) the third antenna is different than the first antenna, and (iv) the fourth antenna is different than the second antenna, includes adaptively filtering the signals conforming to the second communication protocol to generate first interference estimate signals, and receiving first signals via the first antenna. The first signals include (i) first desired signals conforming to the first communication protocol and (ii) first interference signals corresponding to the signals conforming to the second communication protocol. The method also includes processing the first signals using the first interference estimate signals to remove at least a portion of the first interference signals, adaptively filtering the signals conforming to the fourth communication protocol to generate second interference estimate signals, and receiving second signals via the third antenna. The second signals include (i) second desired signals conforming to the third communication protocol and (ii) second interference signals corresponding to the signals conforming to the fourth communication protocol. The method also includes processing the second signals using the second interference estimate signals to remove at least a portion of the second interference signals.

In another embodiment, a communication device configured to operate according to at least a first communication protocol, a second communication protocol different than the first communication protocol, a third communication protocol, and a fourth communication protocol different than the third communication protocol, includes a first antenna, a second antenna different than the first antenna, a third antenna, a fourth antenna different than the third antenna, a first transmitter configured to generate signals conforming to the second communication protocol to be transmitted via the second antenna, a first adaptive filter configured to generate first interference estimate signals from the signals conforming to the second communication protocol, and a first receiver. The first receiver is configured to receive first signals via the first antenna. The first signals include (i) first desired signals conforming to the first communication protocol and (ii) first interference signals corresponding to the signals conforming to the second communication protocol. The first receiver is also configured to process the first signals using the first interference estimate signals to remove at least a portion of the first interference signals. The communication device also includes a second transmitter configured to generate signals conforming to the fourth communication protocol to be transmitted via the fourth antenna, a second adaptive filter configured to generate second interference estimate signals from the signals conforming to the fourth communication protocol, and a second receiver. The second receiver is configured to receive second signals via the third antenna. The second signals include (i) second desired signals conforming to the third communication protocol and (ii) second interference signals corresponding to the signals conforming to the fourth communication protocol. The second receiver is also configured to process the second signals using the second interference estimate signals to remove at least a portion of the second interference signals. At least one of (i) the third communication protocol is different than the first communication protocol, (ii) the fourth communication protocol is different than the second communication protocol, (iii) the third antenna is different than the first antenna, and (iv) the fourth antenna is different than the second antenna.

DETAILED DESCRIPTION

Figure 1:
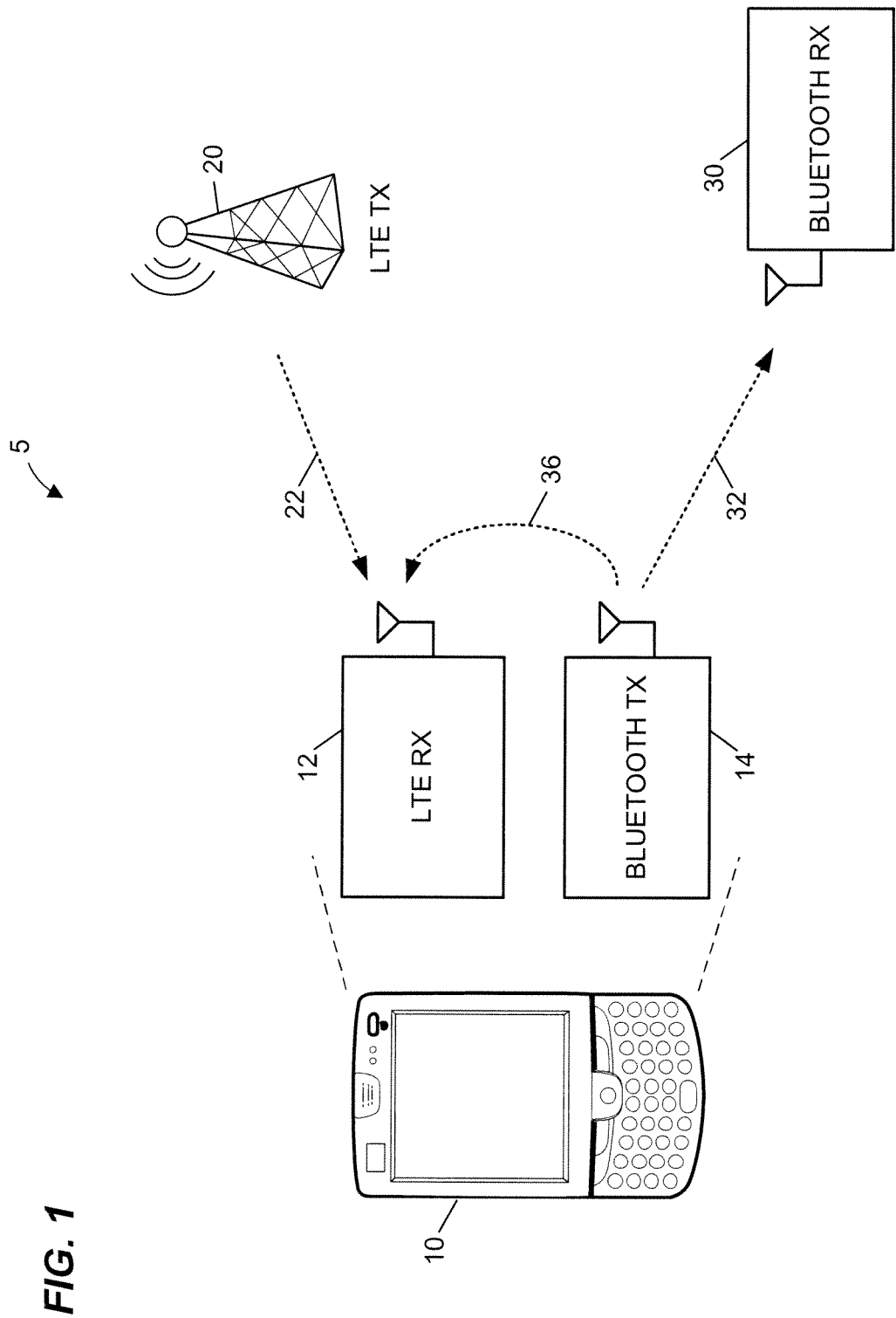
FIG. 1 is a block diagram of an example system that includes a communication device operating according to multiple wireless technologies.

FIG. 1 is a block diagram of an example system 5 in which a communication device 10 operates according to multiple, coexisting wireless technologies. In the example system 5, the communication device 10 is configured to communicate according to both Long Term Evolution (LTE) and Bluetooth wireless communication protocols. To this end, the device 10 includes an LTE receiver 12 configured to receive and decode signals conforming to the LTE protocol and a Bluetooth transmitter 14 configured to generate and transmit signals conforming to the Bluetooth protocol.

The LTE receiver 12 receives LTE signals from an LTE transmitter 20 (e.g., a base station or eNodeB) over a wireless link 22, and the Bluetooth transmitter 14 transmits Bluetooth signals to a Bluetooth receiver 30 (e.g., a Bluetooth interface of a device separate from device 10) over a wireless link 32. In a typical, example use case, the LTE transmitter 20 streams audio from an internet radio service to the LTE receiver 12 of device 10, and the Bluetooth transmitter 14 of the device 10 forwards the audio stream to the Bluetooth receiver 30 to play the audio over a car stereo. In some systems and scenarios, such as the example use case described above, a receiver of device 10 (e.g., LTE receiver 12) receives data over a first wireless technology link (e.g., over link 22) at least in part simultaneously with the transmission of data by a transmitter of device 10 over a second wireless technology link (e.g., over link 32). Moreover, in some systems, the bands or channels utilized by the different wireless technologies overlap in frequency, or are near in frequency. If communications of the two wireless technologies are simultaneous, and sufficiently close or overlapping in frequency, the close physical proximity of the various antennas on the device 10 can lead to a high level of interference (along path 36 in FIG. 1) that may significantly degrade reliability and throughput. For example, in the example use case described above with reference to FIG. 1, transmission of an audio stream over Bluetooth link 32 also results in interference via path 36 that significantly degrades reliability and throughput of the LTE link 22. Interference can also be present in the opposite direction (e.g., an LTE transmitter (not shown) in device 10 may cause interference at a Bluetooth receiver (not shown) in device 10), or in communications from or between other wireless technologies of the device 10.

Figure 2:
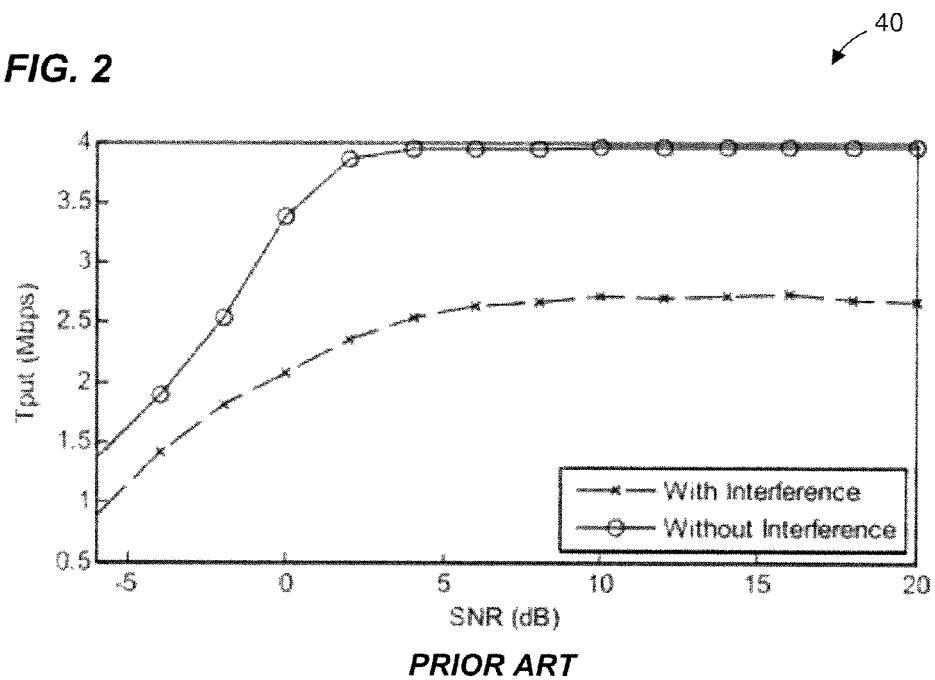
FIG. 2 is a graph showing performance degradation due to interference between wireless technologies of a prior art communication device.

The drop in throughput can significantly degrade the user experience, and may prevent desired services from being provided. FIG. 2 is a graph 40 showing performance degradation due to interference between wireless technologies of a prior art communication device. More specifically, graph 40 shows data throughput (Tput) corresponding to an LTE link (e.g., link 22 of FIG. 1) with and without interference from a coexisting Bluetooth transmitter (e.g., transmitter 14 of FIG. 1). Even in scenarios where the coexisting wireless technologies are in different frequency bands, a programmable gain amplifier (PGA) in a receiver chain of a first wireless technology can be overloaded if an interfering signal of a second, coexisting wireless technology is within the bandwidth of the analog front end of the first technology receiver chain. As a result, desired signals may be subject to higher quantization error and/or distortion (due to clipping) in the receiver.

Figure 3:
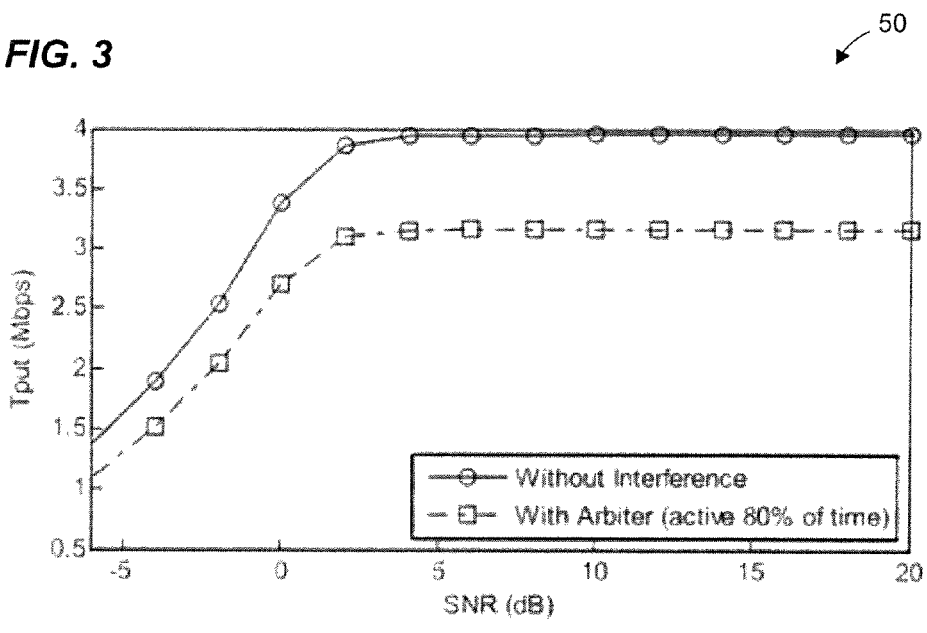
FIG. 3 is a graph showing performance degradation due to interference between wireless technologies of a communication device utilizing a prior art interference mitigation technique.

One prior art technique that addresses this problem uses an arbiter to ensure that only one wireless technology is active at a single time. While this approach may in some cases increase the reliability of the communications of the different wireless technologies in a single device, the time-sharing nature of an arbiter necessarily causes a loss in throughput. This decrease in throughput may prevent high data rate services from being provided (over a cellular interface, for example) when a coexisting wireless technology (e.g., Bluetooth or WiFi) is actively transmitting. FIG. 3 is a graph 50 showing performance degradation due to interference between wireless technologies of a communication device using arbitration to mitigate interference, for an example case in which an arbiter permits a transmitter of a wireless technology to be active 80% of the time.

Figure 4:
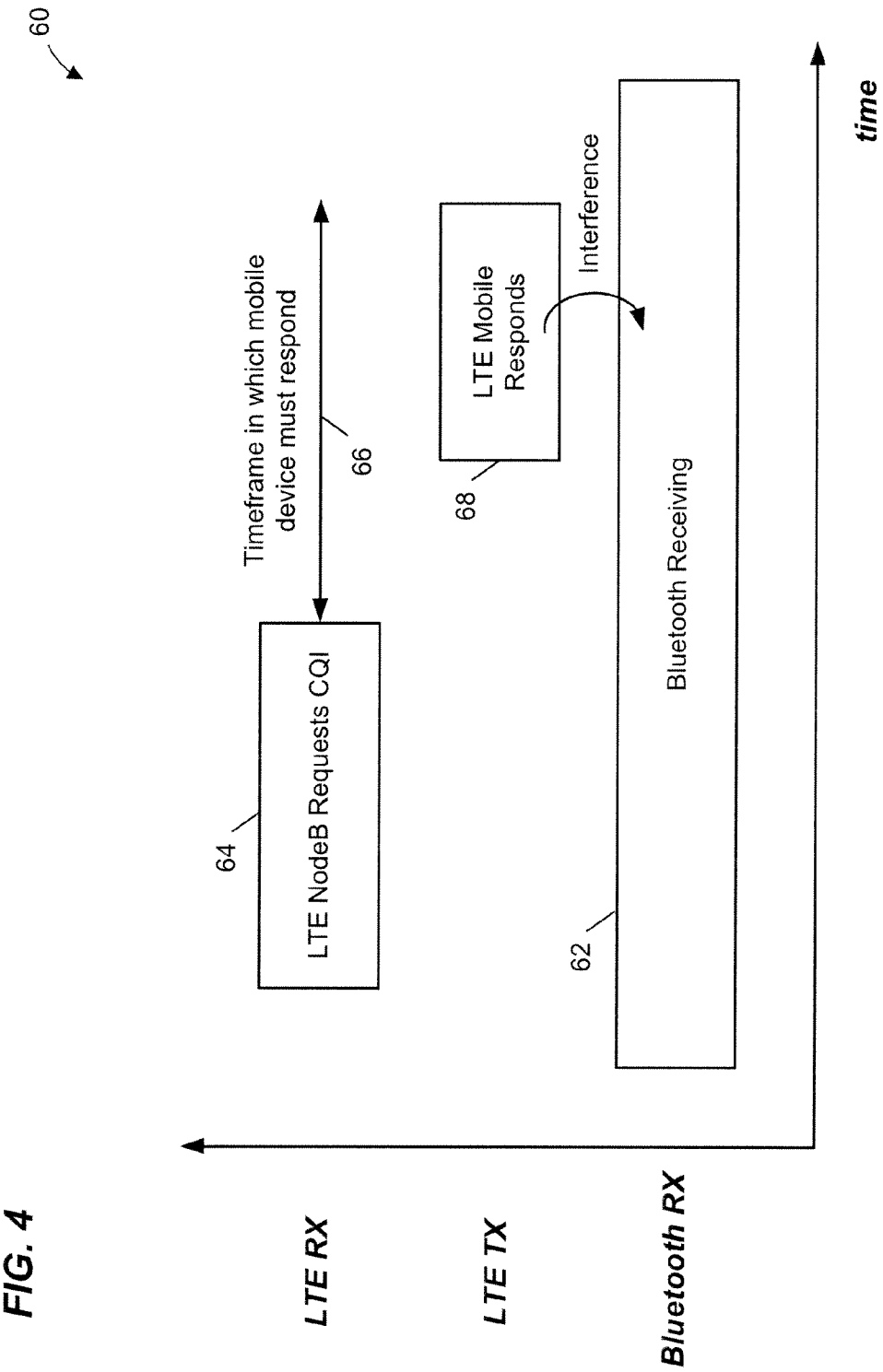
FIG. 4 is a chart showing example timing requirements in a communication device utilizing multiple wireless technologies.

Arbitration suffers from other drawbacks as well. Because different wireless technologies are typically developed independently of each other, timing constraints arising from the different standards corresponding to the technologies may make it difficult or impossible for arbitration to completely remove interference. An example timing constraint problem is depicted in chart 60 of FIG. 4, which is described here with reference to the system 5 of FIG. 1. In the scenario of FIG. 4, a continuous data stream 62 such as an audio stream is being received by a Bluetooth receiver of communication device 10 (e.g., a mobile device). While the data stream 62 is being received, the LTE receiver 12 of the device 10 receives a channel quality indicator (CQI) request 64 from LTE transmitter 20 (e.g. an LTE NodeB). Because the Bluetooth data stream 62 is continuous, and because the LTE Standard requires that the LTE response 68 be sent within a particular timeframe 66, arbitration techniques may be unable to prevent the LTE response 68 from interfering with reception of the Bluetooth data stream 62 at device 10 (e.g., via the reverse of the interference path 36 shown in FIG. 1).

While FIGS. 1-4 show interference scenarios in which LTE and Bluetooth technologies coexist in a single device, similar issues may arise where other technologies are utilized, such as UMTS, WiFi, or WiMax. In some cases, a single device includes three or more wireless technologies which can interfere with each other.

In embodiments described below, interference is reduced between the communications of two or more wireless technologies of a single communication device (e.g., a mobile handset, smartphone, laptop, tablet, etc.) using one or more adaptive filters. More specifically, one or more adaptive filters are utilized to reduce or minimize interference caused by a transmitter of a first wireless technology at a receiver of a second, different wireless technology. In some embodiments, each adaptive filter generates an estimate of an interference signal using a transmit signal of the second wireless technology, which is then subtracted from a received signal in a receiver of the first wireless technology. In various embodiments, the estimate of the interference signal is subtracted from the received signal in the analog domain, the digital time domain, and/or the digital frequency domain.

FIGS. 5-8 are block diagrams of example architectures implementing interference mitigation techniques, according to various embodiments. In some embodiments, each example architecture shown is an architecture included within a single, user-side communication device, such as a smartphone, mobile handset, laptop, or tablet device. In other embodiments, each example architecture shown is an architecture included within a single, network-side communication device, such as a base station, eNodeB, wireless access point (AP), or femtocell device. Each of the architectures of FIGS. 5-8 includes at least a receiver of a first wireless technology and a transmitter of a second, different wireless technology. For example, in various embodiments, the first wireless technology is either Universal Mobile Telecommunications System (UMTS), LTE, WiMax, or any other cellular or WWAN technology, and the second wireless technology is either Bluetooth, WiFi, wireless USB, or any other WLAN or WPAN technology (or vice versa). A receiver is described herein as a receiver of a particular wireless technology if the receiver is configured to receive and process (e.g., demodulate and decode) signals conforming to a wireless communication protocol of the technology. Similarly, a transmitter is described herein as a transmitter of a particular wireless technology if the transmitter is configured to generate and transmit signals conforming to a wireless communication protocol of the technology. In some embodiments, the architectures described below include additional circuitry or units not shown in FIGS. 5-8. For example, some embodiments include additional amplification, buffering, and/or filtering between the various units depicted in FIGS. 5-8.

Figure 5:
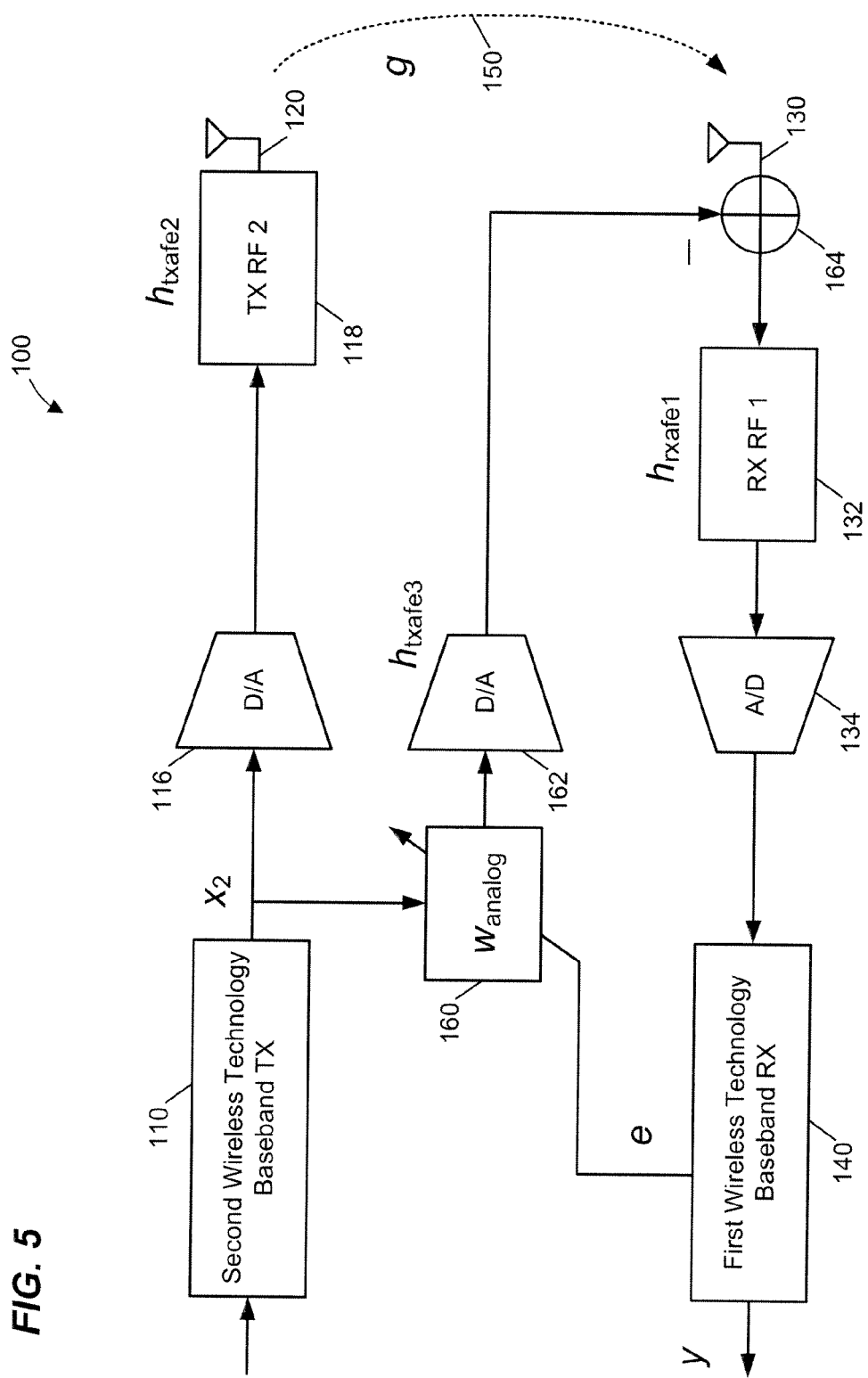
FIG. 5 is a block diagram of an example architecture implementing an interference mitigation technique in the analog domain, according to an embodiment.

FIG. 5 is a block diagram of an example architecture 100 implementing an interference mitigation technique in the analog domain, according to an embodiment. A transmitter of the second wireless technology of architecture 100 includes a baseband transmit section 110, a digital-to-analog (D/A) converter 116, a transmit radio frequency (RF) front end 118, and a transmit antenna 120. While FIG. 5 shows a single transmit antenna 120, other embodiments include multiple transmit antennas. Still other embodiments include no antennas, as interference can occur between different transmit and receive chains of different technologies existing on the same device even in the absence of antennas (e.g. where one or both technologies are wired rather than wireless technologies). The baseband transmit section 118 is configured to generate signals conforming to a protocol of the second wireless technology. For example, in one embodiment where the second wireless technology is LTE, the baseband transmit section 118 is configured to generate LTE data units. In some embodiments (e.g., where the second wireless technology utilizes orthogonal frequency division multiplexing (OFDM)), the baseband transmit section 118 includes an inverse fast Fourier transform (IFFT) unit and/or a cyclic prefix unit that adds a cyclic prefix. In other embodiments (e.g., where the second wireless technology does not utilize OFDM symbols), the baseband transmit section 118 does not include an IFFT unit and/or cyclic prefix unit. After D/A converter 116 converts the generated signals to analog baseband signals, the front end 118 up-converts the analog signals (in one or multiple up-conversion stages) to the RF carrier frequency for transmission via antenna(s) 120, in an embodiment.

A receiver of the first wireless technology of architecture 100 includes a receive antenna 130, a receive RF front end 132, an analog-to-digital (A/D) converter 134, and a baseband receive section 140. While FIG. 5 shows a single receive antenna 130, other embodiments include multiple receive antennas. In an embodiment, the receive antenna(s) 130 receive(s) signals conforming to the protocol of the first wireless technology, which are then down-converted in frequency to analog baseband signals and converted to digital signals by A/D converter 134. The digital baseband signals are then processed (e.g., demodulated, decoded, etc.) by baseband receive section 140. In some embodiments (e.g., where the first wireless technology utilizes OFDM), the baseband receive section 140 includes a cyclic prefix unit that strips a cyclic prefix and/or a fast Fourier transform (FFT) unit. In other embodiments (e.g., where the first wireless technology utilizes does not utilize OFDM symbols), the baseband receive section 140 does not include an FFT unit and/or a cyclic prefix unit.

Due to the physical proximity of transmit antenna(s) 120 and receive antenna(s) 130 on the communication device with architecture 100, signals of the second wireless technology that are transmitted by antenna(s) 120 are received at antenna(s) 130 via interference channel 150. In some scenarios, these interfering signals add to desired signals of the first wireless technology that are also received at antenna(s) 130.

The example architecture 100 of FIG. 5 reduces the interfering component of the received signal relative to the desired component by generating an estimate of the interfering signal and subtracting the estimate of the interfering signal from the received signal. To generate the estimate of the interfering signal, an adaptive filter 160 is provided with the digital baseband transmit signal $x_2$ output by the baseband transmit section 110. In alternative embodiments, the adaptive filter 160 is instead provided with a signal from an earlier stage of the baseband transmit section 110 (e.g., prior to one or more filters preceding D/A converter 116, etc.), or a signal that is generated based on the digital baseband transmit signal $x_2$. Although the architecture 100 in some embodiments filters a signal other than $x_2$ at filter 160, the following discussion refers to filtering of the signal $x_2$ for ease of explanation. The filtered signal is provided to a D/A converter 162, which outputs an analog signal to a subtractor 164. The subtractor 164 subtracts the analog estimate of the interfering signal from received signal, and the output of subtractor 164 is provided to the receive RF front end 132. An error signal e is generated in the baseband receive section 140 based on the received signal, and provided to the adaptive filter 160, in an embodiment. In one embodiment, the error signal e is used to modify one or more filter coefficients of the adaptive filter 160. The error signal e is described in more detail below.

In the example architecture 100, where subtraction of the interference signal estimate occurs in the analog domain, the digital receive signal y output by baseband receive section 140 can be expressed as:

$$y = h_{rxafe1} * (h_1 * x_1 + h_{txafe2} * g * x_2 - h_{txafe3} * w_{analog} * x_2 + z)$$
$$= h_{eff1} * x_1 + (h_{eff2} - h_{eff3}) * x_2 + h_{rxafe1} * z$$

Equation 1 where $$h_{eff1} = h_{rxafe1} * h_1$$ Equation 2

$$h_{eff2} = h_{rxafe1} * h_{txafe2} * g$$ Equation 3

$$h_{eff3} = h_{rxafe1} * h_{txafe3} * w_{analog}$$ Equation 4

In Equations 1-4 above, $h_{rxafe1}$ denotes the impulse response of the RF front end ("RX RF 1") 132 and the A/D 134 (collectively, the "receive analog front end 132, 134") of the first wireless technology receiver, $h_{txafe2}$ denotes the impulse response of the D/A converter 116 and RF front end 118 (collectively, the "transmit analog front end 116, 118") of the second wireless technology transmitter, and $h_{txafe3}$ denotes the impulse response of a third analog front end used for constructing the signal to be subtracted in the analog domain via subtractor 164. The impulse response $h_{txafe3}$ includes the impulse response of the D/A converter 162, in an embodiment. In some embodiments, the impulse response $h_{txafe3}$ also includes the impulse response of additional analog circuitry (not shown in FIG. 5) coupled between the D/A converter 162 and the subtractor 164. Returning to Equations 1-4 above, $w_{analog}$ denotes the impulse response of the adaptive filter 160, g denotes the interference channel 150 from the transmitter of the second wireless technology to the receiver of the first wireless technology, $x_2$ denotes the signal to be transmitted that is generated by the baseband transmit section 110 of the second wireless technology, z denotes background noise, $x_1$ denotes the signal of interest sent by a remote transmitter of the first wireless technology, and $h_1$ denotes the wireless channel from the remote transmitter of the first wireless technology to the receiver of the first wireless technology. $h_{eff2}$ is referred to herein as the "effective interference channel."

In one embodiment, the adaptive filter 160 is set by first measuring the effective interference channel $h_{eff2}$. During this measurement period, in an embodiment, the adaptive filter 160 coefficients are set to zero and the received signal can therefore be expressed as:

$$y = h_{eff1} * x_1 + h_{eff2} * x_2 + h_{rxafe1} * z$$ Equation 5

Because the transmit signal $x_2$ is known at the communication device implementing the architecture 100, in an embodiment the nth tap of the effective interference channel $h_{eff2}$ is estimated by correlating the received signal y with a time delayed version of $x_2$:

$$\hat{h}_{eff2}[n] = \frac{1}{N} \sum_{m=1}^{N} \frac{y[m] \cdot x_2^*[m-n]}{|x_2[m-n]|}$$ Equation 6

In some embodiments, where the transmitted signal from the first wireless technology $x_1$ is (at certain times) known at the communication device implementing the architecture 100, and where a reliable estimate of $h_{eff1}$ is available ($\hat{h}_{eff1}$), the estimate of the effective interference is improved by first subtracting the term $\hat{h}_{eff1} * x_1$ from y as follows:

$$\tilde{y} = y - \hat{h}_{eff1} * x_1$$ Equation 7

In various different embodiments, the transmitted signal $x_1$ is at certain times known at the receiving communication device because the signal $x_1$ is a known preamble or preamble portion, a known pilot tone, a known reference signal, and/or a signal from the output of a decoder of the baseband receive section 140. In other embodiments, the transmit signal $x_1$ is another suitable known signal.

In an embodiment, the effective interference channel is then estimated as:

$$\hat{h}_{eff2}[n] = \frac{1}{N} \sum_{m=1}^{N} \frac{\tilde{y}[m] \cdot x_2^*[m-n]}{x_2[m-n]}$$ Equation 8

Once an estimate of the effective interference channel is generated, in an embodiment, the adaptive filter 160 is configured to minimize the mean square error between the estimate of $h_{eff2}$ and $h_{eff3}$ as follows:

$$w_{analog} = \arg\min_{w} \left\| \hat{h}_{eff2} - h_{rxafe1} * h_{txafe3} * w \right\|^2$$ Equation 9

In various embodiments, the impulse response $h_{rxafe1}$ of the receive analog front end 132, 134 and the impulse response $h_{txafe3}$ of the D/A converter 162 are determined either by measurement (similar to the effective interference channel estimation described above), by offline calibration, or by other suitable techniques.

In another embodiment, the adaptive filter 160 is configured to minimize the power of the residual interference as follows:

$$w_{analog} = \arg\min_{w} E[\|(h_{eff2} - h_{rxafe1} * h_{txafe3} * w) * x_2\|^2]$$ Equation 10

In yet another embodiment, the adaptive filter 160 is configured to use a least squares approach as follows:

$$w_{analog} = \underset{w}{\operatorname{argmin}} \sum_{n=1}^{N} |e[n]|^2 \qquad \text{Equation 11}$$

where the error sequence is defined as:

$$e = y - h_{rxafe1} * h_{txafe3} * w * x_2 - \hat{h}_{eff1} * x_1 \qquad \text{Equation 12}$$

In one embodiment, Equation 12 is solved using a recursive least squares (RLS) approach. In another embodiment, a least mean squares (LMS) approach is used as follows:

$$w_{analog}[m]' = w_{analog}[m] + \mu e[n] x_2^*[m] \qquad \text{Equation 13}$$

where $w_{analog}'$ is the updated version of $w_{analog}$ and $\mu$ is the step size.

While particular techniques for configuring the adaptive filter 160 are described above in connection with Equations 5-13, other embodiments use any other suitable techniques. Moreover, in various embodiments, the adaptive filter 160 is configured such that any of various criteria are improved or optimized. For example, in various embodiments, the adaptive filter 160 is configured such that interference from the second wireless technology transmissions is minimized, and/or or such that performance of the first wireless technology (as defined by throughput, delay, packet error rate, jitter, and/or any other quality of service constraint suitable for the particular technology and service) is maximized.

In an alternative embodiment, the subtractor 164 of the architecture 100 is located between the receive RF front end 132 and the A/D converter 134 (i.e., the interference estimate signal is subtracted from received signals after passing through the RF front end 132), and the above equations are modified accordingly (e.g., the interference estimate term $h_{txafe3} * w_{analog} * x_2$ is placed outside the parentheses in Equation 1, such that the term is not convolved with $h_{rxafe1}$).

Figure 6:
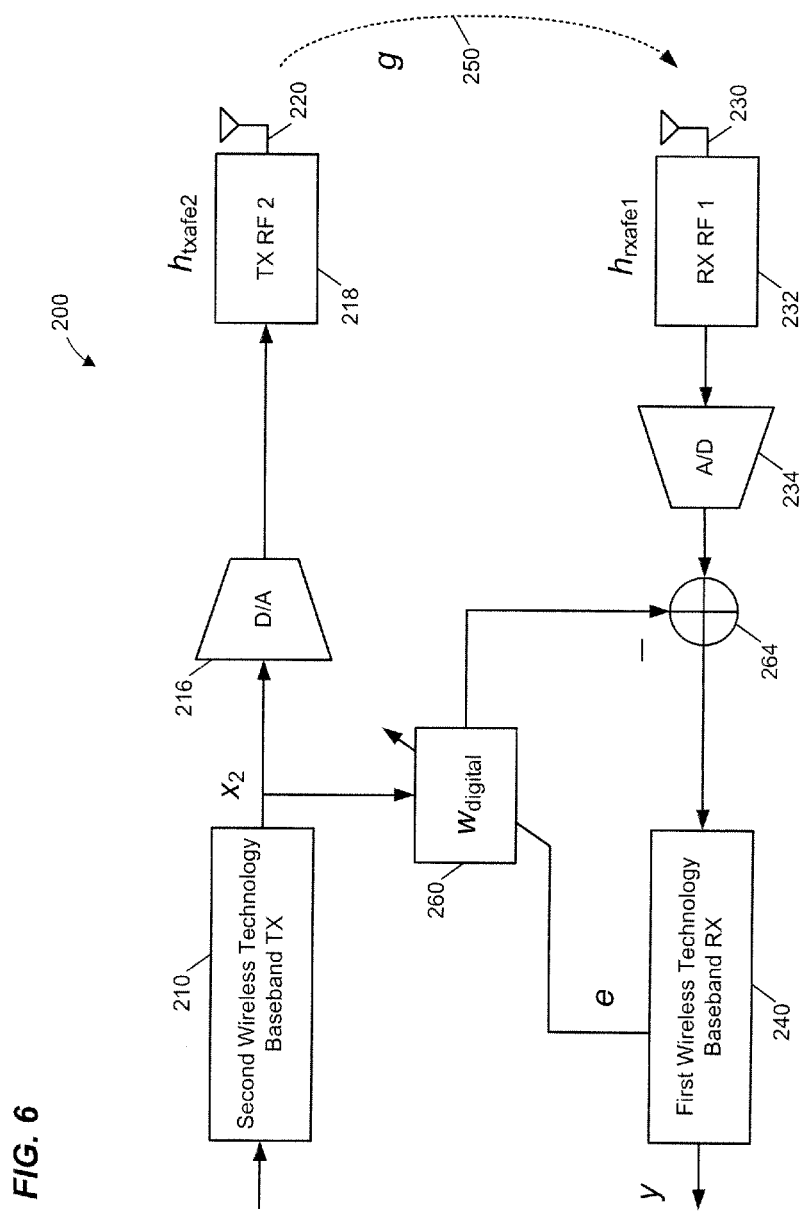
FIG. 6 is a block diagram of an example architecture implementing an interference mitigation technique in the digital time domain, according to an embodiment.
Figure 7:
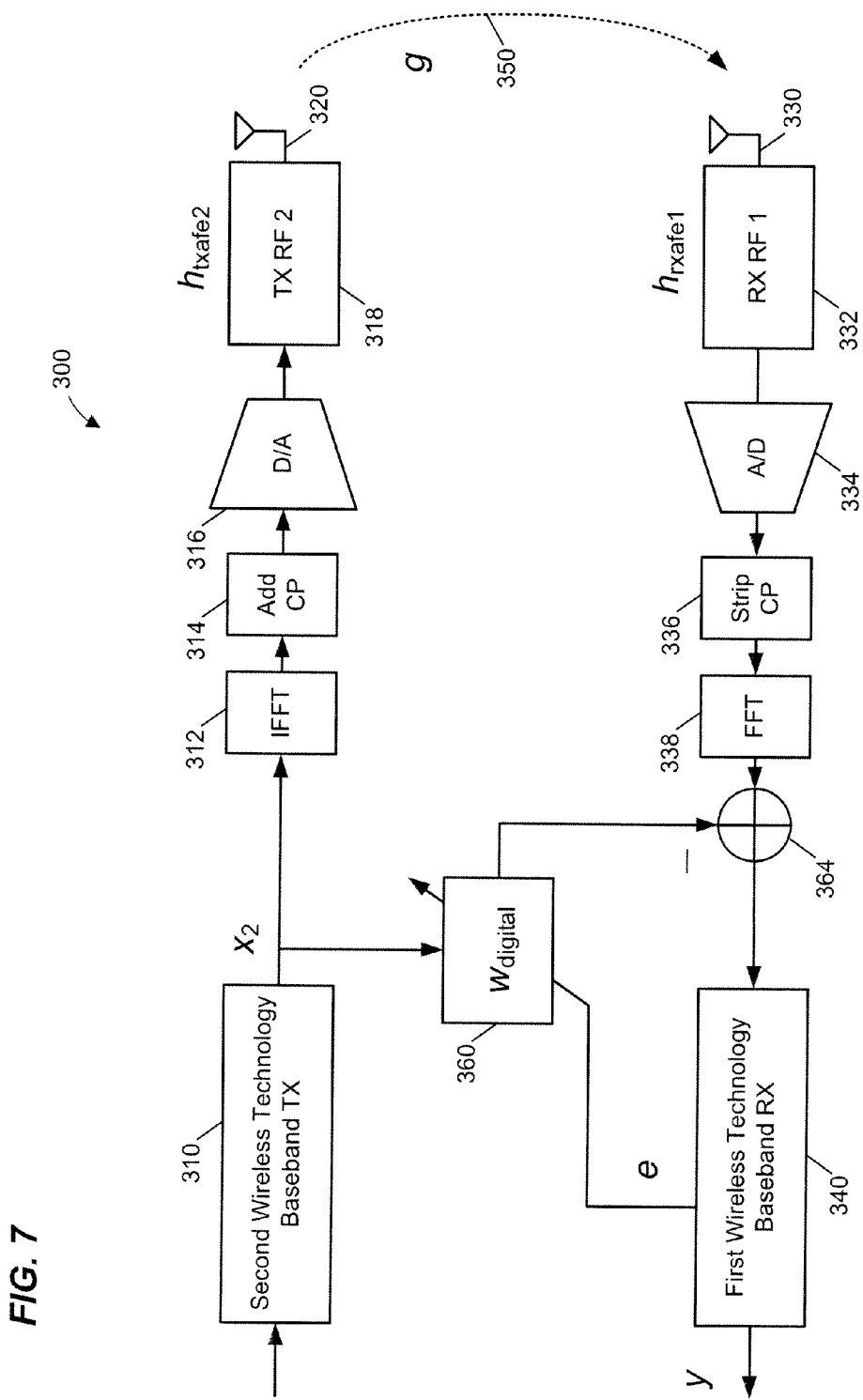
FIG. 7 is a block diagram of an example architecture implementing an interference mitigation technique in the digital frequency domain, according to an embodiment.

By subtracting at least a portion of the interference component of the received signal prior to the A/D converter 134 in the receiver, the power of the signal that is quantized by the A/D converter 134 is generally reduced, which helps to reduce quantization error and distortion due to clipping in the receiver. However, in some embodiments, subtracting the interference estimate in the analog domain adds hardware complexity due to the inclusion of D/A converter 162. In some embodiments, therefore, the estimated interference signal is instead subtracted from the received signal in the digital domain, and the D/A converter 162 of FIG. 5 is omitted. FIGS. 6 and 7 are block diagrams of example architectures implementing interference mitigation techniques in the digital time domain and digital frequency domain, respectively, according to two embodiments. Generally, the digital time domain approach of FIG. 6 may be used regardless of the type of signals being utilized, while either the digital time domain approach of FIG. 6 or the digital frequency domain approach of FIG. 7 may be used when OFDM, or another technology that processes signals in the frequency domain, is utilized. In some of these embodiments, where the first and second wireless technologies utilize different sampling rates, the signal $x_2$ is resampled to match the sampling rate of the first wireless technology (e.g., prior to filtering with an adaptive filter, in an embodiment).

Similar to FIG. 5, the example architecture 200 of FIG. 6 includes a receiver of a first wireless technology and a transmitter of a second wireless technology. The transmitter of the second wireless technology includes a baseband transmit section 210, a D/A converter 216, a transmit RF front end 218, and a transmit antenna 220. While FIG. 6 shows a single transmit antenna 220, other embodiments include multiple transmit antennas. The baseband transmit section 218, D/A converter 216, and front end 218 are similar to the baseband transmit section 118, D/A converter 116, and front end 118 of FIG. 5, respectively, in an embodiment. The receiver of the first wireless technology includes a receive antenna 230, a receive RF front end 232, an A/D converter 234, and a baseband receive section 240. While FIG. 6 shows a single receive antenna 230, other embodiments include multiple receive antennas. The receive antenna 230, front end 232, A/D converter 234, and baseband receive section 240 are similar to the receive antenna 130, front end 132, A/D converter 134, and baseband receive section 140 of FIG. 5, in an embodiment.

Similar to the architecture 100 of FIG. 5, signals of the second wireless technology that are transmitted by antenna(s) 220 are received at antenna(s) 230 via an interference channel 250, and, in some scenarios, the interfering signals add to desired signals of the first wireless technology that are also received at antenna(s) 230. Also similar to the architecture 100 of FIG. 5, the architecture 200 reduces the interfering component of the received signal relative to the desired component by generating an estimate of the interfering signal and subtracting the estimate of the interfering signal from the received signal. To generate the estimate of the interfering signal, an adaptive filter 260 is provided with the digital baseband transmit signal $x_2$ that is output by the baseband transmit section 210. In alternative embodiments, the adaptive filter 260 is instead provided with a signal from an earlier stage of the baseband transmit section 210 (e.g., prior to one or more filters preceding D/A converter 216, etc.), or a signal that is generated based on the digital baseband transmit signal $x_2$. Although the architecture 200 in some embodiments filters a signal other than $x_2$ at filter 260, the following discussion refers to filtering of the signal $x_2$ for ease of explanation. Unlike the architecture 100 of FIG. 5, the filtered signal in the example architecture 200 of FIG. 6 is not passed through a D/A converter before being input to a subtractor 264. The subtractor 264 subtracts the digital estimate of the interfering signal from the baseband receive signal output by the receive RF front end 232. An error signal e is generated in the baseband receive section 240 based on the received signal, and provided to the adaptive filter 260, in an embodiment. In one embodiment, the error signal e is used to modify one or more filter coefficients of the adaptive filter 260.

In the example architecture 200, where subtraction of the interference signal estimate occurs in the digital time domain, the digital receive signal y output by baseband receive section 240 can be expressed as:

$$\begin{aligned} y &= h_{rxafe1} * (h_1 * x_1 + h_{txafe2} * g * x_2 + \\ &\quad z) - w_{digital} * x_2 \\ &= h_{eff1} * x_1 + (h_{eff2} - w_{digital}) * x_2 + h_{rxafe1} * z \end{aligned} \qquad \text{Equation 14}$$

where $$h_{eff1} = h_{rxafe1} * h_1 \qquad \text{Equation 15}$$

$$h_{eff2} = h_{rxafe1} * h_{txafe2} * g \qquad \text{Equation 16}$$

In Equations 14-16 above, $h_{rxafe1}$ denotes the impulse response of the receive RF front end 232 and A/D converter 234 (collectively, the "receive analog front end 232, 234") of the first wireless technology receiver, $h_{txafe2}$ denotes the impulse response of the transmit RF front end 218 and D/A converter 216 (collectively, the "transmit analog front end 216, 218") of the second wireless technology transmitter.

$w_{digital}$ denotes the impulse response of the adaptive filter 260, g denotes the interference channel 250 from the transmitter of the second wireless technology to the receiver of the first wireless technology, $x_2$ denotes the signal to be transmitted that is generated by the baseband transmit section 210 of the second wireless technology, z denotes background noise, $x_1$ denotes the signal of interest sent by a remote transmitter of the first wireless technology, and $h_1$ denotes the wireless channel from the remote transmitter of the first wireless technology to the receiver of the first wireless technology. $h_{\textit{eff}2}$ is again referred to as the "effective interference channel."

In one embodiment, the adaptive filter 260 is set by first measuring the effective interference channel $h_{\textit{eff}2}$. In various embodiments, any of the techniques described above with reference to FIG. 5, or any other suitable technique, is used to estimate the effective interference channel. In an embodiment, once the estimate of the effective interference channel is available, the adaptive filter 260 is configured to minimize the mean square error between the estimate of $h_{\textit{eff}2}$ and $w_{digital}$ as follows:

$$w_{digital} = \arg\min_w \|\hat{h}_{\textit{eff}2} - w\|^2 \qquad \text{Equation 17}$$

In another embodiment, the adaptive filter 260 is configured to minimize the power of the residual interference as follows:

$$w_{digital} = \arg\min_w E[\|(h_{\textit{eff}2} - w) * x_2\|^2] \qquad \text{Equation 18}$$

In yet another embodiment, the adaptive filter 260 is configured using a least squares approach as follows:

$$w_{digital} = \arg\min_w \sum_{n=1}^{N} |e[n]|^2 \qquad \text{Equation 19}$$

where the error sequence is defined as:

$$e = y - w^* x_2 - \hat{h}_{\textit{eff}1}^* x_1 \qquad \text{Equation 20}$$

In one embodiment, Equation 20 is solved using an RLS approach. In another embodiment, an LMS approach is used as follows:

$$w_{digital}[m]' = w_{digital}[m] + \mu e[n] x_2^*[m] \qquad \text{Equation 21}$$

where $w_{digital}'$ is the updated version of $w_{digital}$ and $\mu$ is the step size.

While particular techniques for configuring the adaptive filter 260 are described above in connection with Equations 14-21, other embodiments use any other suitable techniques for setting the filter 260. Moreover, in various embodiments, the adaptive filter 260 is configured such that any of various criteria are improved or optimized. For example, in various embodiments, the adaptive filter 260 is configured such that interference from the second wireless technology transmissions is minimized, and/or such that performance of the first wireless technology (as defined by throughput, delay, packet error rate, jitter, and/or any other quality of service constraints suitable for the particular technology and service) is maximized.

FIG. 7 is a block diagram of an example architecture 300 implementing an interference mitigation technique in the digital frequency domain, according to an embodiment. The architecture 300 is used, for example, in some embodiments where the first and second wireless technologies utilize OFDM, or another technology that processes signals in the frequency domain.

Similar to FIGS. 5 and 6, the example architecture 300 of FIG. 7 includes a receiver of a first wireless technology and a transmitter of a second wireless technology. The transmitter of the second wireless technology includes a baseband transmit section 310, a D/A converter 316, a transmit RF front end 318, and a transmit antenna 320. While FIG. 7 shows a single transmit antenna 320, other embodiments include multiple transmit antennas or no antennas. The baseband transmit section 318, D/A converter 316, and RF front end 318 are similar to the baseband transmit section 118, D/A converter 116, and RF front end 118 of FIG. 5, respectively, in an embodiment, with the exception that an IFFT unit 312 and cyclic prefix unit 314 are depicted as separate from the baseband transmit section 318. The IFFT unit 312 converts the transmit signal $x_2$ (which, in the example architecture 300 of FIG. 7, is a frequency domain baseband signal) to a time domain digital baseband signal, and the cyclic prefix unit 314 adds a cyclic prefix to the time domain digital baseband signal. In some embodiments, the cyclic prefix unit 314 is omitted from the architecture 300. The receiver of the first wireless technology includes a receive antenna 330, a receive RF front end 332, an A/D converter 334, and a baseband receive section 340. While FIG. 7 shows a single receive antenna 330, other embodiments include multiple receive antennas, or no antennas. The receive antenna 330, front end 332, A/D converter 334, and baseband receive section 340 are similar to the receive antenna 130, RF front end 132, A/D converter 134, and baseband receive section 140 of FIG. 5, in an embodiment, with the exception that a cyclic prefix unit 336 and an FFT unit 338 are depicted as separate from the baseband receive section 340. The cyclic prefix unit 336 strips the cyclic prefix from the received signals, and the FFT unit 338 transforms the received baseband digital time domain signal to a baseband digital frequency domain signal. In some embodiments, the cyclic prefix unit 336 is omitted from the architecture 300.

Similar to the architecture 100 of FIG. 5, signals of the second wireless technology that are transmitted by antenna(s) 320 are received at antenna(s) 330 via an interference channel 350, and, in some scenarios, the interfering signals add to desired signals of the first wireless technology that are also received at antenna(s) 330. Also similar to the architecture 100 of FIG. 5, the architecture 300 reduces the interfering component of the received signal relative to the desired component by generating an estimate of the interfering signal and subtracting the estimate of the interfering signal from the received signal. To generate the estimate of the interfering signal, an adaptive filter 360 is provided with the (frequency domain) digital baseband transmit signal $x_2$ that is output by the baseband transmit section 310. In alternative embodiments, the adaptive filter 360 is instead provided with a signal from an earlier stage of the baseband transmit section 310 (e.g., prior to one or more filters preceding IFFT unit 312, etc.), or a signal that is generated based on the digital baseband transmit signal $x_2$. Although the architecture 300 in some embodiments filters a signal other than $x_2$ at filter 360, the following discussion refers to filtering of the signal $x_2$ for ease of explanation. Unlike the architecture 200 of FIG. 6, the filter 360 of the example architecture 300 operates on a frequency domain signal $x_2$. A subtractor 364 subtracts the digital estimate of the interfering signal from the baseband receive signal output by the FFT unit 338. An error signal e is generated in the baseband receive section 340 based on the received signal, and provided to the adaptive filter 360, in an embodiment. In one embodiment, the error signal e is used to modify one or more filter coefficients of the adaptive filter 360.

Although the transmit signal $x_2$ operated on by filter 360 of architecture 300 is a frequency domain signal, the effective interference channel is estimated, and the coefficients of the filter 360 are updated, in a manner similar to that described above for architecture 200 of FIG. 6, in various embodiments. By subtracting the frequency domain estimate of the transmit signal, however, the architecture 300 essentially provides an efficient implementation of an overlap-and-save/overlap-and-add linear convolution, and may lead to reduced hardware complexity if the FFT engine of FFT unit 338 is already available in the first wireless technology receiver.

Figure 8:
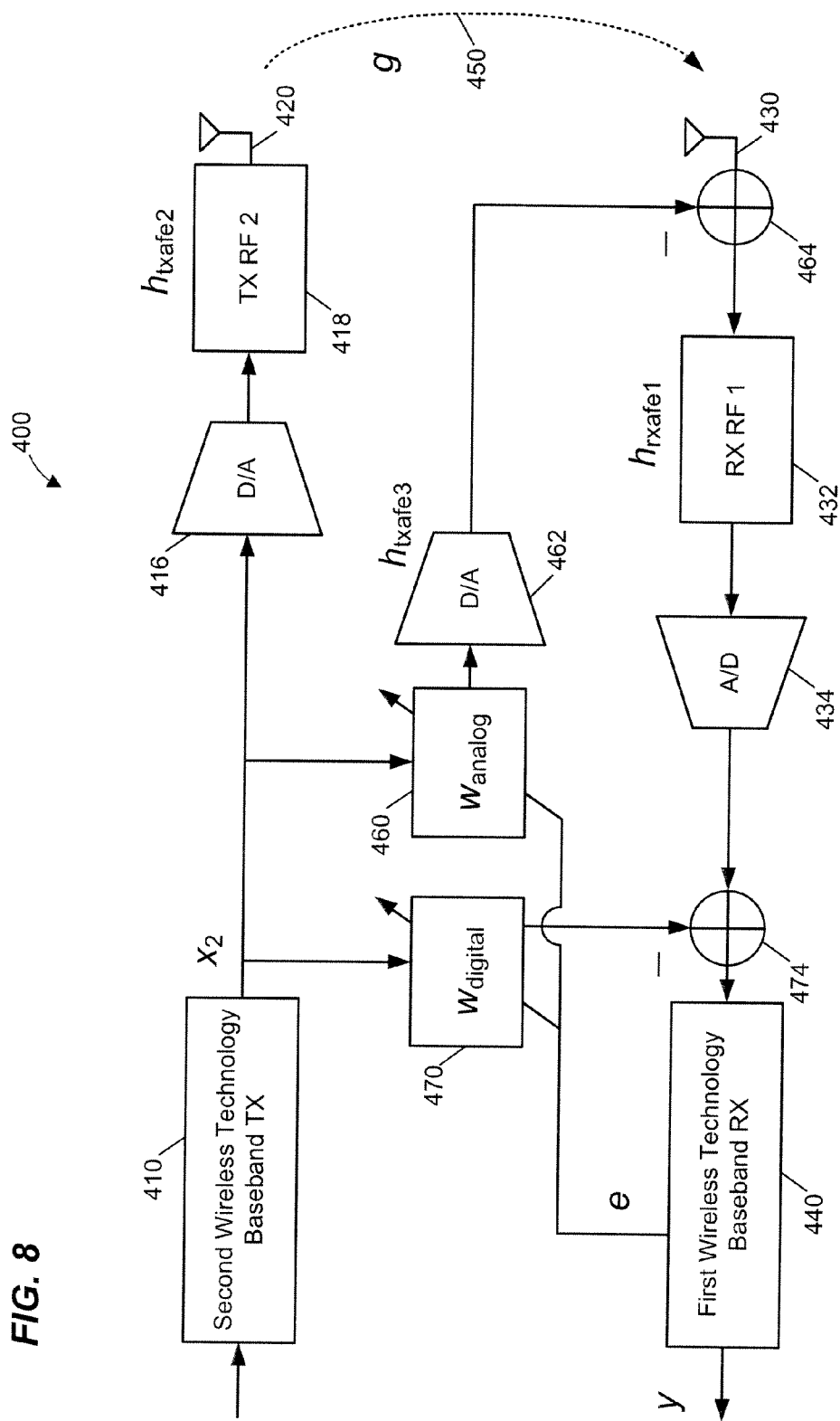
FIG. 8 is a block diagram of an example architecture implementing an interference mitigation technique in both the analog domain and the digital time domain, according to an embodiment.

In other embodiments, two or more of the above architectures are combined in a single architecture. For example, FIG. 8 is a block diagram of an architecture 400 implementing an interference mitigation technique in both the analog domain (e.g., similar to architecture 100 of FIG. 5) and the digital time domain (e.g., similar to architecture 200 of FIG. 6), according to an embodiment. Similar to FIGS. 5-7, the example architecture 400 of FIG. 8 includes a receiver of a first wireless technology and a transmitter of a second, different wireless technology. The transmitter of the second wireless technology includes a baseband transmit section 410, a D/A converter 416, a transmit RF front end 418, and a transmit antenna 420. While FIG. 8 shows a single transmit antenna 420, other embodiments include multiple transmit antennas. The baseband transmit section 418, D/A converter 416, and front end 418 are similar to the baseband transmit section 118, D/A converter 116, and front end 118 of FIG. 5, respectively, in an embodiment. The receiver of the first wireless technology includes a receive antenna 430, a receive RF front end 432, an A/D converter 434, and a baseband receive section 440. While FIG. 8 shows a single receive antenna 430, other embodiments include multiple receive antennas. The receive antenna 430, front end 432, A/D converter 434, and baseband receive section 440 are similar to the receive antenna 130, front end 132, A/D converter 134, and baseband receive section 140 of FIG. 5, in an embodiment.

Similar to the architectures of FIGS. 5-7, signals of the second wireless technology that are transmitted by antenna(s) 420 can be received at antenna(s) 430 via an interference channel 450, and, in some scenarios, the interfering signals add to desired signals of the first wireless technology that are also received at antenna(s) 430. Unlike the architectures of FIGS. 5-7, however, the architecture 400 reduces the interfering component of the received signal relative to the desired component by generating two estimates of the interfering signal and subtracting both of the estimates of the interfering signal from the received signal. To generate the first estimate of the interfering signal, a first adaptive filter 460 is provided with the digital baseband transmit signal $x_2$ that is output by the baseband transmit section 410. To generate the second estimate of the interfering signal, a second adaptive filter 470 is provided with the digital baseband transmit signal $x_2$ that is output by the baseband transmit section 410. In alternative embodiments, the adaptive filter 460 and/or the adaptive filter 470 is instead provided with a signal from an earlier stage of the baseband transmit section 410 (e.g., prior to one or more filters preceding D/A converter 416, etc.), or a signal that is generated based on the digital baseband transmit signal $x_2$. In some embodiments, the adaptive filter 460 receives a different signal (e.g., the signal $x_2$ subject to different processing) than the adaptive filter 470. Although the architecture 400 in some embodiments filters a signal other than $x_2$ at filter 460 and/or filter 470, the following discussion refers to filtering of the signal $x_2$ for ease of explanation. The signal filtered by the adaptive filter 460 is passed through a D/A converter 462 before being input to a first subtractor 464, in an embodiment. The first subtractor 464 subtracts the analog estimate of the interfering signal from the signal received by the antenna 430 before sending the signal to RF front end 432. After A/D converter 434 converts the received signal (with partial removal of the interference) to an analog signal, a second subtractor 474 subtracts the digital estimate of the interfering signal from the analog baseband received signal. An error signal e is generated in the baseband receive section 440 based on the received signal, and provided to the adaptive filter 460 and to the adaptive filter 470, in an embodiment. In one embodiment, the error signal e is used to modify one or more filter coefficients of the adaptive filters 460 and 470. In some embodiments, a first error signal generated by the baseband receive section 440 is provided to adaptive filter 460, and a second, different error signal generated by the baseband receive section 440 is provided to adaptive filter 470.

In the example architecture 400, the receive signal y output by baseband receive section 240 can be expressed as:

$$\begin{aligned} y &= h_{rxafe1} * (h_1 * x_1 + h_{txafe2} * g * x_2 - \\ &\quad h_{txafe3} * w_{analog} * x_2 + z) - w_{digital} * x_2 \\ &= h_{eff1} * x_1 + (h_{eff2} - h_{eff3}) * x_2 + h_{rxafe1} * z \end{aligned} \quad \text{Equation 22}$$

where $$h_{eff1} = h_{rxafe1} * h_1 \quad \text{Equation 23}$$

$$h_{eff2} = h_{rxafe1} * h_{txafe2} * g \quad \text{Equation 24}$$

$$h_{eff3} = h_{rxafe1} * h_{txafe3} * w_{analog} + w_{digital} \quad \text{Equation 25}$$

In Equations 22-25 above, $h_{rxafe1}$ denotes the impulse response of the receive RF front end 432 and A/D converter 434 (collectively, the "receive analog front end 432, 434") of the first wireless technology receiver, $h_{txafe2}$ denotes the impulse response of the D/A converter 416 and transmit RF front end 418 (collectively, the "transmit analog front end 416, 418") of the second wireless technology transmitter, and $h_{txafe3}$ denotes the impulse response of a third analog front end used for constructing the signal to be subtracted in the analog domain via subtractor 464. The impulse response $h_{txafe3}$ includes the impulse response of the D/A converter 462, in an embodiment. In some embodiments, the impulse response $h_{txafe3}$ also includes the impulse response of additional analog circuitry (not shown in FIG. 8) coupled between the D/A converter 462 and the subtractor 464. Returning to Equations 22-25 above, $w_{analog}$ denotes the impulse response of the adaptive filter 460, g denotes the interference channel 450 from the transmitter of the second wireless technology to the receiver of the first wireless technology, $x_2$ denotes the signal to be transmitted that is generated by the baseband transmit section 410 of the second wireless technology, z denotes background noise, $x_1$ denotes the signal of interest sent by a remote transmitter of the first wireless technology, $h_1$ denotes the wireless channel from the remote transmitter of the first wireless technology to the receiver of the first wireless technology, and $w_{digital}$ denotes the impulse response of the adaptive filter 470. $h_{eff2}$ is again referred to as the "effective interference channel."

In various embodiments, any of the techniques described above with reference to FIG. 5 (or any other suitable techniques) are used to estimate the effective interference channel, any of the techniques described above with reference to FIG. 5 (or any other suitable techniques) are used to configure (e.g., update the coefficients of) adaptive filter 460, and any of the techniques described above with reference to FIG. 6 (or any other suitable techniques) are used to configure adaptive filter 470. In some embodiments where an iterative technique such as RLS or LMS is used to update coefficients of the filters 460 and 470, the coefficients of the two filters 460, 470 are updated on different time frames. In one embodiment, for example, the coefficients of the filter 460 are updated until convergence is reached, and then the coefficients of the filter 470 are updated until convergence is reached. This serial algorithm can be represented as:

begin
  update analog coefficients until convergence
  update digital coefficients until convergence
  end In an alternative embodiment, the coefficients of the filters 460, 470 are updated according to a nested algorithm, such as:

begin
  repeat
    update analog coefficients
    repeat
      update digital coefficients
    until convergence of digital coefficients
  until convergence of analog coefficients
  end Other embodiments combine the architecture 100 of FIG. 5 (analog domain) and the architecture 300 of FIG. 7 (digital frequency domain), combine the architecture 200 of FIG. 6 (digital time domain) and the architecture 300 of FIG. 7 (digital frequency domain), or combine the architecture 100 of FIG. 5 (analog domain), the architecture 200 of FIG. 6 (digital time domain), and the architecture 300 of FIG. 7 (digital frequency domain). For example, one embodiment combining the architectures 100, 200, and 300 includes three appropriately located adaptive filters and three appropriately located subtractors.

While each of FIGS. 5-8 illustrates an example architecture in which an interference component from a second wireless communication technology is subtracted from a received signal in a receiver of a first wireless communication technology, other embodiments additionally include a reciprocal architecture for subtracting an interference component from the first wireless communication technology from a received signal in a receiver of the second wireless technology.

Moreover, some embodiments use interference mitigation techniques relating to three or more wireless communication technologies. For example, in various embodiments where a single communication device includes at least a receiver of a first wireless communication technology, a transmitter of a second wireless communication technology, and a transmitter of a third wireless communication technology, the device includes an architecture similar to any one of architectures 100, 200, 300, and 400 for removing interference caused by the transmitter of the second wireless communication technology from a signal received by the receiver of the first wireless communication technology, and an architecture similar to any one of architectures 100, 200, 300, and 400 for removing interference caused by the transmitter of the third wireless communication technology from the same received signal. As another example, in various embodiments where a single communication device includes at least a receiver of a first wireless communication technology, a transmitter of a second wireless communication technology, and a receiver of a third wireless communication technology, the device includes an architecture similar to any one of architectures 100, 200, 300, and 400 for removing interference caused by the transmitter of the second wireless communication technology from a signal received by the receiver of the first wireless communication technology, and an architecture similar to any one of architectures 100, 200, 300, and 400 for removing interference caused by the transmitter of the second wireless communication technology from a signal received by the receiver of the third wireless communication technology.

Figure 9:
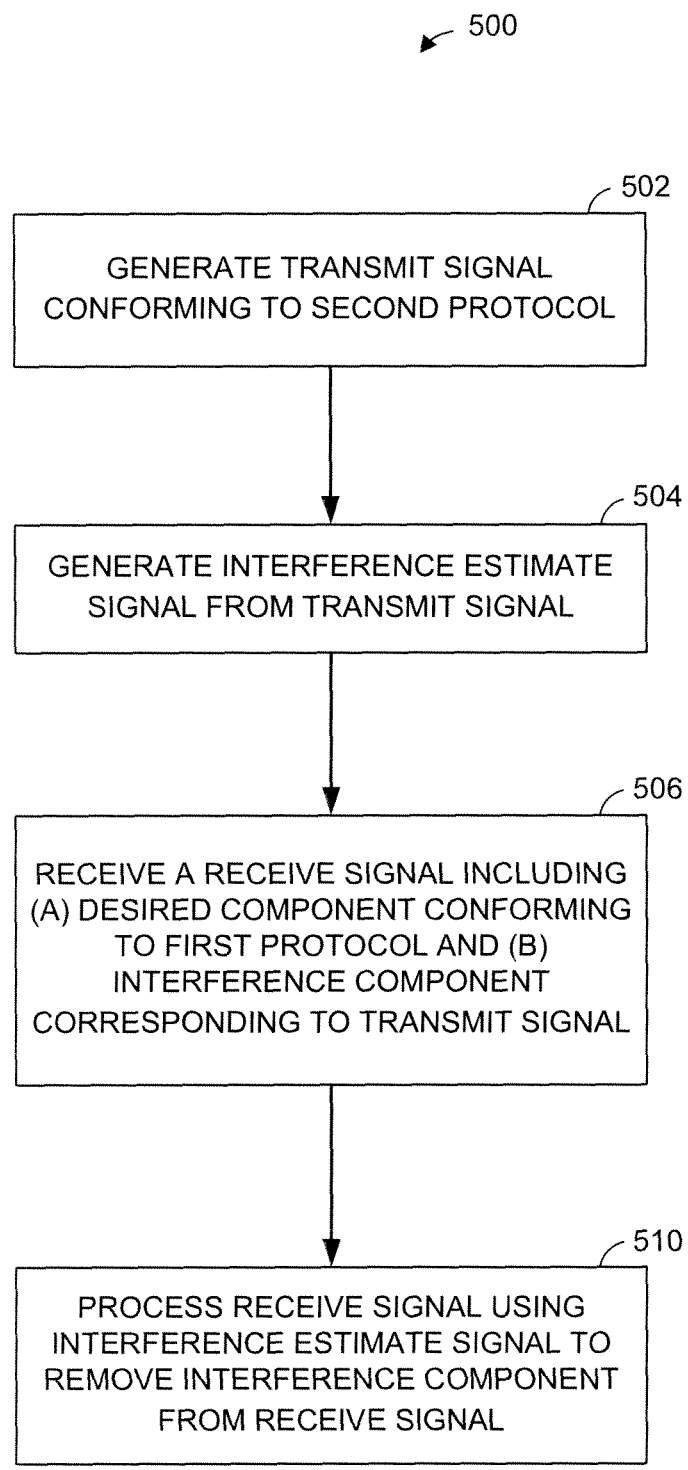
FIG. 9 is a flow diagram of an example method for mitigating interference between two wireless technologies utilized in a communication device, according to an embodiment.

FIG. 9 is a flow diagram of an example method 500 for mitigating interference between two wireless technologies utilized in a communication device, according to an embodiment. In some embodiments, the method 500 is implemented in a single, user-side communication device, such as a smartphone, mobile handset, laptop, or tablet device. In other embodiments, the method 500 is implemented in a single, network-side communication device, such as a base station, eNodeB, wireless AP, or femtocell device. The communication device implementing the method 500 is configured to operate according to at least a first wireless communication protocol of a first wireless technology (e.g., Bluetooth, WiFi, WiMax, wireless USB, UMTS, WCDMA, HSPA+, LTE, LTE-Advanced, 1xRTT, EVDO, EVDV, etc.) and a second wireless communication protocol of a second, different wireless technology (e.g., a different one of Bluetooth, WiFi, WiMax, wireless USB, UMTS, WCDMA, HSPA+, LTE, LTE-Advanced, 1xRTT, EVDO, EVDV, etc.). In particular, the communication device implementing the method 500 includes at least a receiver operating according to the first wireless communication protocol and a transmitter operating according to the second wireless communication protocol.

At block 502, a transmit signal conforming to the second wireless communication protocol is generated in the transmitter of the second wireless technology. In an embodiment, the transmit signal is a digital signal generated by a baseband transmit section of the transmitter of the second wireless technology (such as the baseband transmit section 110 of FIG. 5, in an embodiment).

At block 504, an interference estimate signal is generated, from the transmit signal generated at block 502, using an adaptive filter. In various embodiments, the adaptive filter is similar to the adaptive filter 160 of FIG. 5, the adaptive filter 260 of FIG. 6, or the adaptive 360 of FIG. 7. At block 506, a receive signal is received at the receiver of the first wireless technology. The receive signal includes a desired component conforming to the first wireless communication protocol and an interference component corresponding to the transmit signal generated at block 502. For example, in some embodiments and scenarios, the desired component is a signal sent by a remote transmitter of the first wireless technology, and the interference component is the signal generated at block 502 after having traversed an interference channel between one or more transmit antennas of the second wireless technology and one or more receive antennas of the first wireless technology.

At block 510, the receive signal received at block 506 is processed, using the first interference estimate signal generated at block 504, to remove at least a portion of the interference component from the receive signal. In some embodiments, processing the receive signal using the interference estimate signal includes subtracting the interference estimate signal (generated at block 504) from the receive signal (received at block 506) in the analog domain. In other embodiments, processing the receive signal using the interference estimate signal includes subtracting the interference estimate signal from the receive signal in the digital domain. In some of these latter embodiments, the subtraction occurs in the digital time domain. In other of these latter embodiments (e.g., certain embodiments in which the transmit signal generated at block 502 is an OFDM signal), the subtraction occurs in the digital frequency domain.

In some embodiments, the order of the blocks of method 500 is changed, and/or some of the blocks are divided into separate blocks. For example, in one embodiment, receive signal is received at block 506 before, and/or simultaneously with, block 504. Moreover, in various embodiments, the method 500 is implemented using any one of the architectures shown in (and/or described with reference to) FIGS. 5-8. Furthermore, in some embodiments, the method 500 includes additional steps not shown in FIG. 9. In one embodiment where processing of the receive signal at block 510 includes subtracting the interference estimate signal from the receive signal in the analog domain, for example, the method 500 includes converting the interference estimate signal generated at block 504 from the digital domain to the analog domain prior to the processing at block 510.

In some embodiments where processing the receive signal includes subtracting the interference estimate signal from the receive signal in the digital frequency domain, the method 500 further includes generating a second interference estimate signal from the transmit signal generated at block 502 using a second adaptive filter, and subtracting the second interference estimate signal from the receive signal (received at block 506) in the digital time domain to remove an additional portion of the interference component from the receive signal.

In some embodiments where processing the receive signal includes subtracting the interference estimate signal from the receive signal in the digital (time and/or frequency) domain, the method 500 further includes generating a second interference estimate signal from the transmit signal generated at block 502 using a second adaptive filter, converting the second interference estimate signal from the digital domain to the analog domain, and, after converting the signal, subtracting the second interference estimate signal from the receive signal (received at block 506) in the analog domain to remove an additional portion of the interference component from the receive signal.

In another embodiment, the method 500 includes generating an error signal and modifying one or more parameters (e.g., filter coefficients) of the adaptive filter using the error signal. In an embodiment, the error signal is generated by a baseband receive section of the receiver of the first wireless technology. In some embodiments and scenarios, the error signal corresponds to a difference between (a) the receive signal received at block 506 and (b) the product of a channel estimate and a known signal transmitted by a remote transmitter of the first wireless technology (e.g., the remote transmitter that sent the desired component of the signal received at block 506). For example, in various embodiments, the known signal is at least a portion of a preamble, one or more pilot tones, and/or a reference signal. In one embodiment, the error signal corresponds to a difference between (a) a soft estimate of the desired component of the receive signal received at block 506 (e.g., an estimate of the desired component before being decoded at the receiver of the first wireless technology) and (b) a hard estimate of the desired component of the receive signal received at block 506 (e.g., an estimate of the desired component after being decoded at the receiver of the first wireless technology). In some embodiments, modifying the filter parameters using the error signal includes modifying one or more coefficients of the adaptive filter using an LMS technique, an RLS technique, a normalized LMS technique, and/or a least squares technique.

In one embodiment, where the communication device implementing the method 500 also includes a second transmitter that is configured to operate according to the first wireless communication technology and a second receiver that is configured to operate according to the second wireless communication technology, the method 500 further includes steps for reciprocally removing interference caused by the first wireless technology from desired signals of the second wireless technology. For example, in an embodiment, the method 500 further includes generating (in the second transmitter) a second transmit signal conforming to the first wireless communication protocol, generating (using a second adaptive filter) a second interference estimate signal from the second transmit signal, and receiving a second receive signal at the second receiver. In an embodiment, the second receive signal includes a desired component conforming to the second wireless communication protocol and an interference component corresponding to the second transmit signal, and the method 500 further includes processing the second receive signal using the second interference estimate signal to remove at least a portion of the interference component corresponding to the second transmit signal from the second receive signal.

In another embodiment, where the communication device implementing the method 500 also includes a second transmitter that is configured to operate according to a third wireless communication technology different than the first and second wireless technologies, and where the receive signal (received at block 506) further includes a second interference component corresponding to a second transmit signal transmitted by the second transmitter, the method 500 further includes steps for removing interference caused by the third wireless technology from desired signals of the first wireless technology. For example, in an embodiment, the method 500 further includes generating a second interference estimate signal from the second transmit signal using a second adaptive filter, and further processing the receive signal (received at block 506) using the second interference estimate signal to remove at least a portion of the second interference component from the receive signal.

In yet another embodiment, where the communication device implementing the method 500 also includes a second receiver that is configured to operate according to a third wireless communication technology different than the first and second wireless technologies, the method 500 further includes steps for removing interference caused by the second wireless technology from desired signals of the third wireless technology. For example, in an embodiment, the method 500 further includes generating a second interference estimate signal from the transmit signal (generated at block 502) using a second adaptive filter, and receiving a second receive signal at the second receiver. In an embodiment, the second receive signal includes a desired component conforming to a third wireless communication protocol (corresponding to the third wireless technology) and an interference component corresponding to the transmit signal generated at block 502, and the method 500 further includes processing the second receive signal using the second interference estimate signal to remove at least a portion of the interference component.

In some embodiments, techniques similar to any one or more of the techniques described above are applied to mitigate interference between multiple pairs of transmit and receive antennas, where each antenna is associated with a particular wireless communication technology. Five example embodiments, for cases where interference is mitigated between two antenna pairs, are shown below in Table 1:

TABLE 1

|  | TX ANT 1 | RX ANT 1 | TX ANT 2 | RX ANT 2 |
|---|---|---|---|---|
| Embodiment #1 | WT 2 | WT 1 | WT 1 | WT 2 |
| Embodiment #2 | WT 2 | WT 1 | WT 1 | WT 3 |
| Embodiment #3 | WT 2 | WT 1 | WT 3 | WT 2 |
| Embodiment #4 | WT 2 | WT 1 | WT 4 | WT 3 |
| Embodiment #5 | WT 2 | WT 1 | WT 2 | WT 1 |

In Table 1, "WT 1" refers to a first wireless technology, "WT 2" refers to a second wireless technology different than WT 1. "WT 3" refers to a third wireless technology different than WT 1 and WT 2, and "WT 4" refers to a fourth wireless technology different than WT 1, WT 2, and WT 3. Moreover, in Table 1, each of the four antennas in the column headings is a separate physical antenna. Thus, for example, the first embodiment of Table 1 represents a reciprocal case in which interference caused by the second wireless technology is mitigated at a receiver of the first wireless technology, and vice versa. As another example, the fifth embodiment of Table 1 represents a case in which interference is estimated and removed on an antenna-by-antenna basis (e.g., the interference from TX ANT 1 is estimated separately from the interference from TX ANT 2, even though both transmit antennas correspond to the second wireless technology). In one alternative to the fifth embodiment, RX ANT 2 is the same antenna as RX ANT 1. In another alternative to the fifth embodiment, RX ANT 2 and RX ANT 1 are different antennas, but TX ANT 2 is the same antenna as TX ANT 1.

Figure 10:
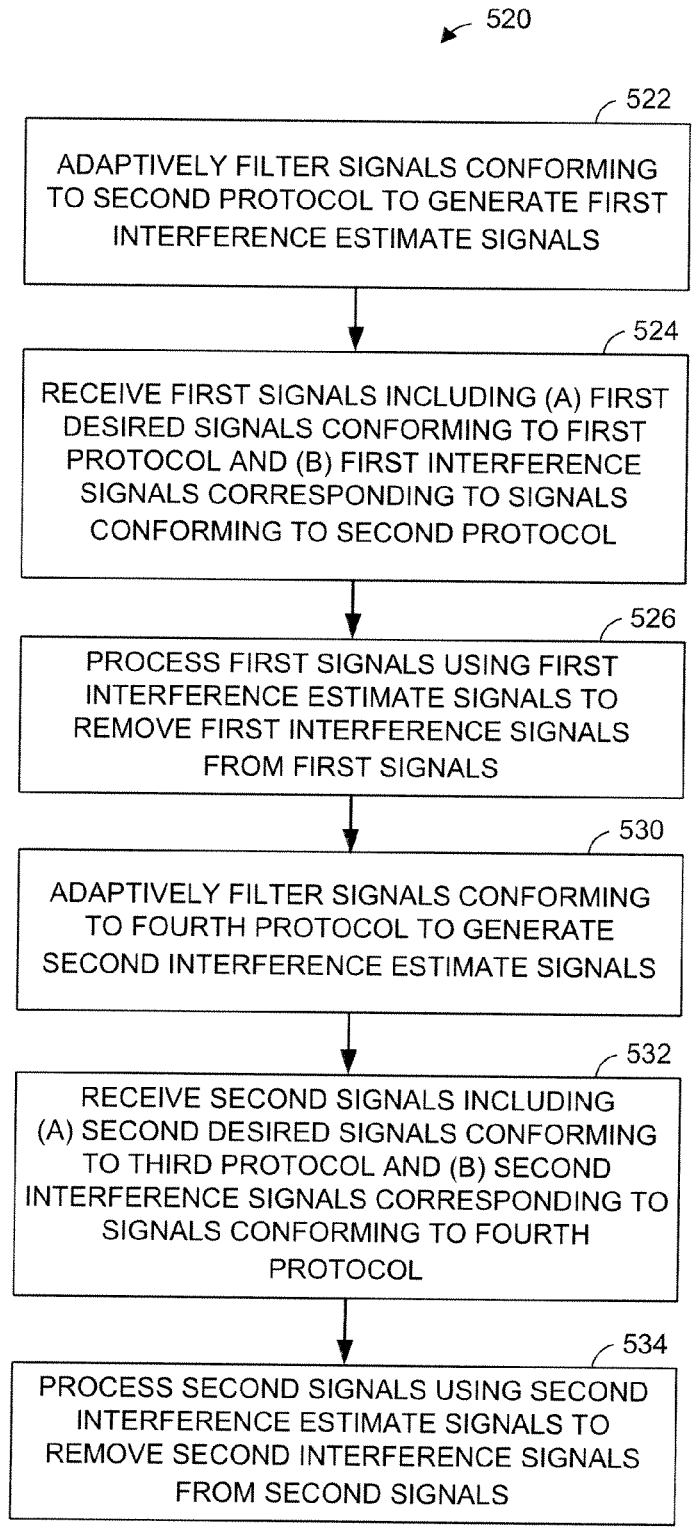
FIG. 10 is a flow diagram of an example method for mitigating interference between antennas and wireless technologies utilized in a communication device, according to an embodiment.

FIG. 10 is a flow diagram of an example method 520 for mitigating interference between antennas and wireless technologies utilized in a communication device, according to an embodiment. The method 520 includes each of the embodiments of Table 1, as well as other embodiments not listed in Table 1. In some embodiments, the method 520 is implemented in a single, user-side communication device, such as a smartphone, mobile handset, laptop, or tablet device. In other embodiments, the method 520 is implemented in a single, network-side communication device, such as a base station, eNodeB, wireless AP, or femtocell device. The communication device implementing the method 520 is configured to decode signals conforming to a first wireless communication protocol that are received via a first antenna, to generate signals conforming to a second wireless communication protocol that are to be transmitted via a second antenna, to decode signals conforming to a third wireless communication protocol received via a third antenna, and to generate signals conforming to a fourth wireless communication protocol that are to be transmitted via a fourth antenna. The various wireless communication protocols correspond to various wireless communication technologies (e.g., Bluetooth, WiFi, WiMax, wireless USB, UMTS, WCDMA, HSPA+, LTE, LTE-Advanced, 1xRTT, EVDO, EVDV, etc.). The second wireless communication protocol is different than the first wireless communication protocol, and the fourth wireless communication protocol is different than the third wireless communication protocol. Moreover, the second antenna (for transmitting signals of the second wireless technology) is different than the first antenna (for receiving signals of the first wireless technology), and the fourth antenna (for transmitting signals of the fourth wireless technology) is different than the third antenna (for receiving signals of the third wireless technology). Further, depending on the embodiment, the third wireless communication protocol is different than the first wireless communication protocol, the fourth wireless communication protocol is different than the second wireless communication protocol, the third antenna is different than the first antenna, and/or the fourth antenna is different than the second antenna. For example, in an embodiment, the third wireless communication protocol is the first wireless communication protocol (i.e., the protocols are the same) and the fourth wireless communication protocol is the second wireless communication protocol, but the third antenna is different than the first antenna and/or the fourth antenna is different than the second antenna. As another example, in an embodiment, the third antenna is the first antenna (i.e., the antennas are the same) and the fourth antenna is the second antenna, but the third wireless communication protocol is different than the first wireless communication protocol and/or the fourth wireless communication protocol is different than the second wireless communication protocol.

At block 522, the signals conforming to the second wireless communication protocol (i.e., the signals transmitted via the second antenna) are adaptively filtered to generate interference estimate signals. Block 522 is similar to block 504 of method 500 in FIG. 9, in an embodiment.

At block 524, signals are received at the first antenna. The signals include desired signals that conform to the first wireless communication protocol and interference signals that correspond to the signals conforming to the second wireless communication protocol (i.e., that corresponds to the signals that are adaptively filtered at block 522). Block 524 is similar to block 506 of method 500 in FIG. 9, in an embodiment.

At block 526, the signals received at block 524 are processed using the interference estimate signals generated at block 522 in order to remove at least a portion of the interference signals from the signal received at block 524. For example, the interference estimate signals are subtracted from the received signals in the analog, digital time, and/or digital frequency domains, in various embodiments. Block 526 is similar to block 510 of method 500 in FIG. 9, in an embodiment.

At block 530, the signals conforming to the fourth wireless communication protocol (i.e., the signals transmitted via the fourth antenna) are adaptively filtered to generate additional interference estimate signals. Block 530 is similar to block 504 of method 500 in FIG. 9, in an embodiment.

At block 532, signals are received at the third antenna. The signals received at block 532 include desired signals that conform to the third wireless communication protocol and interference signals that correspond to the signals conforming to the fourth wireless communication protocol (i.e., that correspond to the signals adaptively filtered at block 530). Block 532 is similar to block 506 of method 500 in FIG. 9, in an embodiment.

At block 534, the signals received at block 532 are processed using the interference estimate signals generated at block 530 in order to remove at least a portion of the interference signals from the signal received at block 532. For example, the interference estimate signals are subtracted from the received signal in the analog, digital time, and/or digital frequency domains, in various embodiments. Block 534 is similar to block 510 of method 500 in FIG. 9, in an embodiment.

In some embodiments, the order of the blocks of method 520 is changed, and/or some of the blocks are divided into separate blocks. For example, in one embodiment, signals are received at blocks 524 and/or 532 before, and/or simultaneously with, blocks 522 and/or 530, respectively. Moreover, in some embodiments, the method 520 includes additional steps not shown in FIG. 10. In one embodiment, for example, the method 520 includes converting the interference estimate signals generated at block 522 and/or the interference estimate signals generated at block 530 from the digital domain to the analog domain. As another example, in an embodiment, the method 520 includes steps for removing interference between one or more additional transmit/receive antenna pairs. Furthermore, in various embodiments, blocks 522, 524, and 526 are implemented using any one of the architectures shown in (and/or described with reference to) FIGS. 5-8, and blocks 530, 532, and 534 are implemented using either an architecture similar to that used to implement blocks 522, 524, and 526, or a different one of the architectures shown in (and/or described with reference to) FIGS. 5-8.

At least some of the various blocks, operations, and techniques described above with reference to FIGS. 5-10 may be implemented in hardware, a processor executing firmware and/or software instructions, or any combination thereof. When implemented utilizing a processor executing software or firmware instructions, the software or firmware instructions may be stored in any computer readable memory such as on a magnetic disk, an optical disk, or other tangible storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable, tangible computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions stored on a memory of other computer-readable storage medium that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While various aspects of the present invention have been described with reference to specific examples, which are intended to be illustrative only and not to be limiting of the invention, changes, additions and/or deletions may be made to the disclosed embodiments without departing from the scope of the invention.

What is claimed is:

1. A method of mitigating interference from a first transmitter of a communication device at a first receiver of the communication device, wherein the communication device is configured to operate according to at least a first communication protocol and a second communication protocol different than the first communication protocol, the method comprising:
   generating, in the first transmitter, a first transmit signal conforming to the second communication protocol;
   generating a first interference estimate signal from the first transmit signal using a first adaptive filter;
   receiving a first receive signal at the first receiver, wherein the first receive signal includes (i) a first desired component conforming to the first communication protocol and (ii) a first interference component corresponding to the first transmit signal; and
   processing the first receive signal using the first interference estimate signal to remove at least a portion of the first interference component from the first receive signal.

2. A method according to claim 1, further comprising converting the first interference estimate signal from the digital domain to the analog domain, and wherein processing the first receive signal using the first interference estimate signal includes, after converting the first interference estimate signal from the digital domain to the analog domain, subtracting the first interference estimate signal from the first receive signal in the analog domain.

3. A method according to claim 1, wherein processing the first receive signal using the first interference estimate signal includes subtracting the first interference estimate signal from the first receive signal in the digital domain.

4. A method according to claim 3, wherein:
   the first transmit signal is an orthogonal frequency division multiplexing (OFDM) signal; and
   subtracting the first interference estimate signal from the first receive signal occurs in the digital time domain.

5. A method according to claim 3, wherein:
   the first transmit signal is an orthogonal frequency division multiplexing (OFDM) signal; and
   subtracting the first interference estimate signal from the first receive signal occurs in the digital frequency domain.

6. A method according to claim 5, further comprising:
   generating a second interference estimate signal from the first transmit signal using a second adaptive filter; and
   subtracting the second interference estimate signal from the first receive signal in the digital time domain to remove another portion of the first interference component from the first receive signal.

7. A method according to claim 3, further comprising:
   generating a second interference estimate signal from the first transmit signal using a second adaptive filter;
   converting the second interference estimate signal from the digital domain to the analog domain; and
   after converting the second interference estimate signal from the digital domain to the analog domain, subtracting the second interference estimate signal from the first receive signal in the analog domain to remove another portion of the first interference component from the first receive signal.

8. A method according to claim 1, wherein:
   the first communication protocol is one of a Bluetooth protocol, a WiFi protocol, a WiMax protocol, a wireless USB protocol, a UMTS protocol, a WCDMA protocol, an HSPA+ protocol, an LTE protocol, or an LTE-Advanced protocol; and
   the second communication protocol is a different one of the Bluetooth protocol, the WiFi protocol, the WiMax protocol, the wireless USB protocol, the UMTS protocol, the WCDMA protocol, the HSPA+ protocol, the LTE protocol, or the LTE-Advanced protocol.

9. A method according to claim 1, further comprising:
generating an error signal; and
modifying one or more parameters of the first adaptive filter using the error signal.

10. A method according to claim 9, wherein the error signal corresponds to a difference between (i) the first receive signal and (ii) a product of a channel estimate and a known signal transmitted by a remote transmitter configured to operate according to the first communication protocol.

11. A method according to claim 10, wherein the known signal transmitted by the remote transmitter is at least one of (i) at least a portion of a preamble, (ii) one or more pilot tones, and (iii) a reference signal.

12. A method according to claim 9, wherein:
the error signal corresponds to a difference between (i) a soft estimate of the first desired component and (ii) a hard estimate of the first desired component;
the soft estimate of the first desired component is an estimate of the first desired component before being decoded in the first receiver, and
the hard estimate of the first desired component is an estimate of the first desired component after being decoded in the first receiver.

13. A method according to claim 9, wherein:
modifying the one or more parameters of the first adaptive filter using the error signal includes modifying one or more coefficients of the first adaptive filter using at least one of (i) a least mean squares (LMS) technique, (ii) a recursive least squares (RLS) technique, (iii) a normalized LMS technique, and (iv) a least squares technique.

14. A method according to claim 1, further comprising:
generating in a second transmitter of the communication device a second transmit signal conforming to the first communication protocol;
generating a second interference estimate signal from the second transmit signal using a second adaptive filter;
receiving a second receive signal at a second receiver, wherein the second receive signal includes (i) a second desired component conforming to the second communication protocol and (ii) a second interference component corresponding to the second transmit signal; and
processing the second receive signal using the second interference estimate signal to remove at least a portion of the second interference component from the second receive signal.

15. A method according to claim 1, further comprising:
generating in a second transmitter of the communication device a second transmit signal conforming to a third communication protocol different than the first communication protocol and different than the second communication protocol, wherein the first receive signal further includes a second interference component corresponding to the second transmit signal;
generating a second interference estimate signal from the second transmit signal using a second adaptive filter; and
processing the first receive signal using the second interference estimate signal to remove at least a portion of the second interference component from the first receive signal.

16. A method according to claim 1, further comprising:
generating a second interference estimate signal from the first transmit signal using a second adaptive filter;
receiving a second receive signal at a second receiver of the communication device, wherein the second receive signal includes (i) a second desired component conforming to a third communication protocol different than the first communication protocol and different than the second communication protocol and (ii) a second interference component corresponding to the first transmit signal; and
processing the second receive signal using the second interference estimate signal to remove at least a portion of the second interference component from the second receive signal.

17. A communication device configured to operate according to at least a first communication protocol and a second communication protocol different than the first communication protocol, the communication device comprising:
a first transmitter configured to generate a first transmit signal conforming to the second communication protocol;
a first adaptive filter configured to generate a first interference estimate signal from the first transmit signal; and
a first receiver configured to
receive a first receive signal, wherein the first receive signal includes (i) a first desired component conforming to the first communication protocol and (ii) a first interference component corresponding to the first transmit signal, and
process the first receive signal using the first interference estimate signal to remove at least a portion of the first interference component from the first receive signal.

18. A communication device according to claim 17, further comprising a digital-to-analog converter configured to convert the first interference estimate signal from the digital domain to the analog domain, and wherein the first receiver is configured to process the first receive signal using the first interference estimate signal at least in part by subtracting the first interference estimate signal from the first receive signal in the analog domain.

19. A communication device according to claim 17, wherein the first receiver is configured to process the first receive signal using the first interference estimate signal at least in part by subtracting the first interference estimate signal from the first receive signal in the digital domain.

20. A communication device according to claim 19, wherein:
the first transmit signal is an orthogonal frequency division multiplexing (OFDM) signal; and
the first receiver is configured to subtract the first interference estimate signal from the first receive signal in the digital time domain.

21. A communication device according to claim 19, wherein:
the first transmit signal is an orthogonal frequency division multiplexing (OFDM) signal; and
the first receiver is configured to subtract the first interference estimate signal from the first receive signal in the digital frequency domain.

22. A communication device according to claim 21, further comprising a second adaptive filter configured to generate a second interference estimate signal from the first transmit signal, and wherein the first receiver is configured to subtract the second interference estimate signal from the first receive signal in the digital time domain to remove another portion of the first interference component from the first receive signal.

23. A communication device according to claim 19, further comprising:
a second adaptive filter configured to generate a second interference estimate signal from the first transmit signal; and a digital-to-analog converter configured to convert the second interference estimate signal from the digital domain to the analog domain,
wherein the first receiver is further configured to subtract the second interference estimate signal from the first receive signal in the analog domain to remove another portion of the first interference component from the first receive signal.

24. A communication device according to claim 17, wherein the first receiver is further configured to generate an error signal used to modify one or more parameters of the first adaptive filter.

25. A communication device according to claim 24, wherein the error signal corresponds to a difference between (i) the first receive signal and (ii) a product of a channel estimate and a known signal transmitted by a remote transmitter configured to operate according to the first communication protocol.

26. A communication device according to claim 17, wherein the communication device is a user-side device.

27. A communication device according to claim 17, wherein the communication device is a network-side device.

28. A communication device according to claim 17, further comprising:
a second transmitter configured to generate a second transmit signal conforming to the first communication protocol;
a second adaptive filter configured to generate a second interference estimate signal from the second transmit signal; and
a second receiver configured to
receive a second receive signal, wherein the second receive signal includes (i) a second desired component conforming to the second communication protocol and (ii) a second interference component corresponding to the second transmit signal, and
process the second receive signal using the second interference estimate signal to remove at least a portion of the second interference component from the second receive signal.

29. A communication device according to claim 17, further comprising:
a second transmitter configured to generate a second transmit signal conforming to a third communication protocol different than the first communication protocol and different than the second communication protocol, wherein the first receive signal further includes a second interference component corresponding to the second transmit signal; and
a second adaptive filter configured to generate a second interference estimate signal from the second transmit signal,
wherein the first receiver is further configured to process the first receive signal using the second interference estimate signal to remove at least a portion of the second interference component from the first receive signal.

30. A communication device according to claim 17, further comprising:
a second adaptive filter configured to generate a second interference estimate signal from the first transmit signal; and
a second receiver configured to
receive a second receive signal, wherein the second receive signal includes (i) a second desired component conforming to a third communication protocol different than the first communication protocol and different than the second communication protocol and (ii) a second interference component corresponding to the first transmit signal, and
process the second receive signal using the second interference estimate signal to remove at least a portion of the second interference component from the second receive signal.

31. A method of mitigating interference in a communication device configured to (i) decode signals conforming to a first communication protocol received via a first antenna, (ii) generate signals conforming to a second communication protocol different than the first communication protocol to be transmitted via a second antenna different than the first antenna, (iii) decode signals conforming to a third communication protocol received via a third antenna, and (iv) generate signals conforming to a fourth communication protocol different than the third communication protocol to be transmitted via a fourth antenna different than the third antenna, wherein at least one of (i) the third communication protocol is different than the first communication protocol, (ii) the fourth communication protocol is different than the second communication protocol, (iii) the third antenna is different than the first antenna, and (iv) the fourth antenna is different than the second antenna, the method comprising:
adaptively filtering the signals conforming to the second communication protocol to generate first interference estimate signals;
receiving first signals via the first antenna, wherein the first signals include (i) first desired signals conforming to the first communication protocol and (ii) first interference signals corresponding to the signals conforming to the second communication protocol;
processing the first signals using the first interference estimate signals to remove at least a portion of the first interference signals;
adaptively filtering the signals conforming to the fourth communication protocol to generate second interference estimate signals;
receiving second signals via the third antenna, wherein the second signals include (i) second desired signals conforming to the third communication protocol and (ii) second interference signals corresponding to the signals conforming to the fourth communication protocol; and
processing the second signals using the second interference estimate signals to remove at least a portion of the second interference signals.

32. A method according to claim 31, wherein
the third communication protocol is the first communication protocol, and
the fourth communication protocol is the second communication protocol.

33. A method according to claim 31, wherein
the third antenna is the first antenna, and
the fourth antenna is the second antenna.

34. A communication device configured to operate according to at least a first communication protocol, a second communication protocol different than the first communication protocol, a third communication protocol, and a fourth communication protocol different than the third communication protocol, the communication device comprising:
a first antenna;
a second antenna different than the first antenna;
a third antenna;
a fourth antenna different than the third antenna:
a first transmitter configured to generate signals conforming to the second communication protocol to be transmitted via the second antenna;

a first adaptive filter configured to generate first interference estimate signals from the signals conforming to the second communication protocol;

a first receiver configured to
- receive first signals via the first antenna, wherein the first signals include (i) first desired signals conforming to the first communication protocol and (ii) first interference signals corresponding to the signals conforming to the second communication protocol, and
- process the first signals using the first interference estimate signals to remove at least a portion of the first interference signals;

a second transmitter configured to generate signals conforming to the fourth communication protocol to be transmitted via the fourth antenna;

a second adaptive filter configured to generate second interference estimate signals from the signals conforming to the fourth communication protocol; and a second receiver configured to
- receive second signals via the third antenna, wherein the second signals include (i) second desired signals conforming to the third communication protocol and (ii) second interference signals corresponding to the signals conforming to the fourth communication protocol, and
- process the second signals using the second interference estimate signals to remove at least a portion of the second interference signals, wherein at least one of (i) the third communication protocol is different than the first communication protocol, (ii) the fourth communication protocol is different than the second communication protocol, (iii) the third antenna is different than the first antenna, and (iv) the fourth antenna is different than the second antenna.

35. A communication device according to claim 34, wherein
the third communication protocol is the first communication protocol, and
the fourth communication protocol is the second communication protocol.

36. A communication device according to claim 34, wherein
the third antenna is the first antenna, and
the fourth antenna is the second antenna.

* * * * *